July 28, 1959  D. E. SUNSTEIN  2,897,490
BANDWIDTH COMPRESSION SYSTEM
Filed Dec. 11, 1952  2 Sheets-Sheet 1
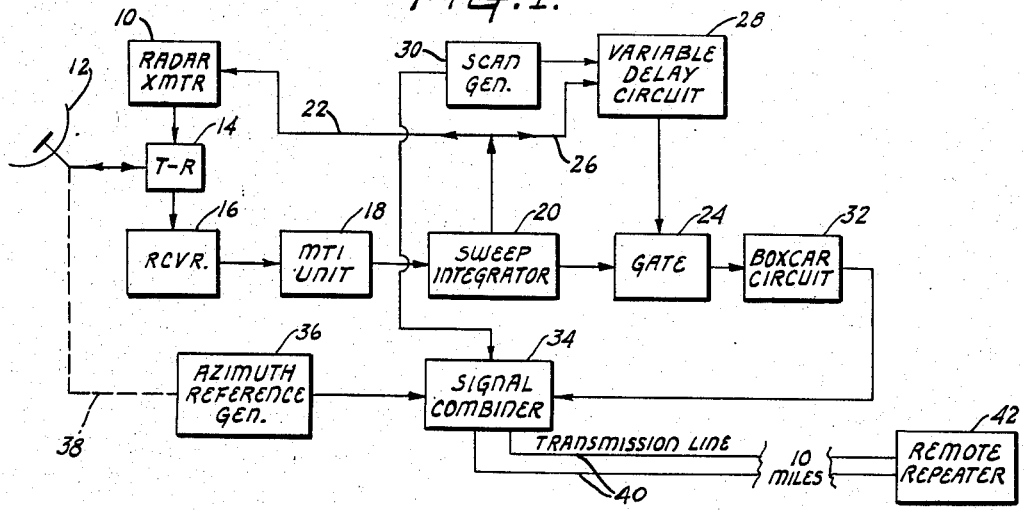
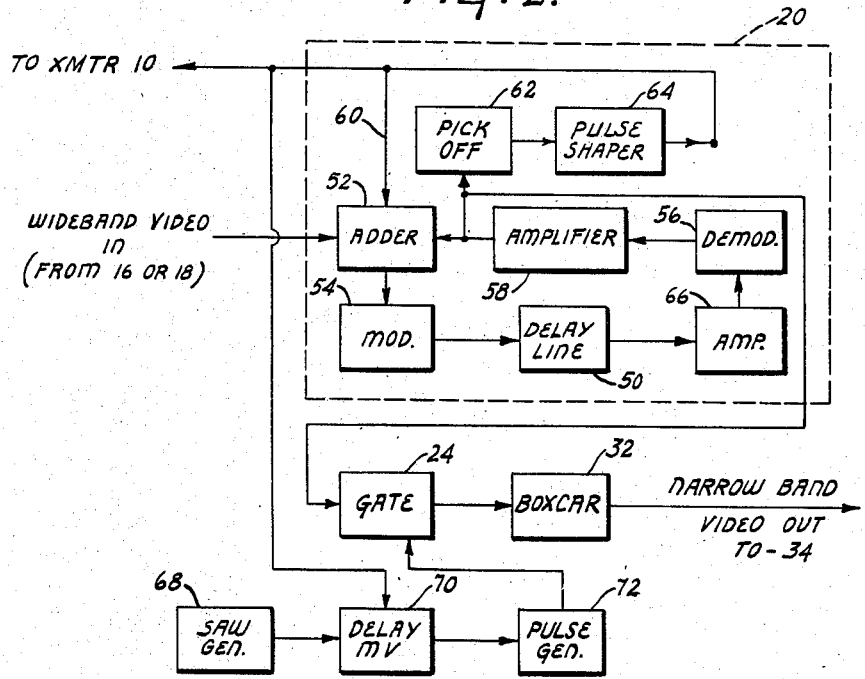
INVENTOR.
DAVID E. SUNSTEIN
BY
Brown, Denk & Lynnestvedt
AGENTS July 28, 1959  D. E. SUNSTEIN  2,897,490
BANDWIDTH COMPRESSION SYSTEM
Filed Dec. 11, 1952  2 Sheets-Sheet 2

INVENTOR.
DAVID E. SUNSTEIN
BY
Brown, Denk & Synnestvedt
AGENTS

2,897,490
BANDWIDTH COMPRESSION SYSTEM

David E. Sunstein, Bala-Cynwyd, Pa., assignor to Philco Corporation, Philadelphia, Pa., a corporation of Pennsylvania Application December 11, 1952, Serial No. 325,407

6 Claims. (Cl. 343—17.1)

This invention relates to radar systems and more particularly to a system for compressing the bandwidth of data accumulated by a radar system. The term "compressing the bandwidth of radar accumulated data" is used throughout the specification to describe the operation of generating a signal containing a substantial amount of the useful intelligence to be derived from target echo signals, this generated signal having a bandwidth or range of component frequencies that is much less than the bandwidth or range of component frequencies of the target echo signals received by the radar system.

It is frequently necessary to locate a radar system in an inaccessible or exposed location in order that the antenna may have an unobstructed view of the region in space to be scanned by the system. However, from the standpoint of convenience, economy and efficiency, it is often desirable to locate the personnel and/or equipment that will process the accumulated data at some conveniently accessible and sheltered location. In some instances it may be desirable to relay information from several widely scattered searching radar systems to one central control point—for example, a central control station in the control tower of an airfield might receive information from four or more radar systems located on a perimeter of 10 mile radius surrounding the airfield.

Until comparatively recently it has been assumed that the bandwidth required for relaying high resolution radar information to a remote indicator was of the order of ⅓ to 2 megacycles. This belief was based on the known fact that the frequency spectrum required for the reproduction of a pulse extends to a frequency equal to the reciprocal of the pulse width and on the further fact that searching radar systems employ transmitted pulses ranging in width from ½ to 3 microseconds. For a 3 microsecond pulse, which would give a range resolution of only ¼ mile, a bandwidth of the order of 330 kilocycles would be required. If the information must be transmitted over more than a very short distance, it has been thought that the transmission could be accomplished only by the use of microwave or very high frequency relay stations which can handle the necessary wide bandwidth. However, recent investigations have shown that the wide bandwidth heretofore thought necessary is not dictated by the range and azimuth resolution of the presentation but by the manner in which a typical radar system accumulates data. For example, if a radar system having a beam width of 3° and an antenna scan of 10 r.p.m. is to scan a range up to 30 miles with ½ mile resolution, it can be shown that there are 120 resolvable elements in azimuth and 60 resolvable elements in range or 7,200 resolvable elements in the total radar presentation. If the antenna scans at the rate of one revolution every six seconds, it follows that 1,200 resolvable elements are scanned per second. It can be shown that the bandwidth B, required to transmit information indicating the presence or absence of targets in each of N possible locations per second, is given by the equation $$B = \frac{N}{\log_2 \frac{(s+n)}{n}}$$

where $s$ and $n$ represent the signal amplitude and noise power, respectively, at the remote receiver, and are expressed in the same units. If the signal amplitude is three times the noise amplitude at the receiver, substitution in the above equation will show that a bandwidth of only 600 cycles is required to reproduce faithfully the data accumulated by the radar system described above. If the noise amplitude is equal to the signal amplitude, the bandwidth requirement is only 1,200 cycles. This tremendous difference, between the bandwidth required to reproduce the data accumulated by the radar system and the bandwidth required to relay the signals received by the radar system, is explained by the fact that a radar system operating under the conditions assumed above will receive as many as 60 echo signals from a point target. All of these signals provide the same information, namely, that a target is located within a particular resolvable element. Normally, all 60 signals will be individually relayed to the remote location. A second reason for the wide bandwidth requirement is found in the fact that a radar system does not utilize the entire period between transmitted pulses for the reception of echo signals. Therefore the relay must remain idle for a large fraction of each interpulse period. However, this condition cannot be readily changed for the practical reason that long range echoes might be returned to the radar system at a time following a succeeding transmitting pulse and therefore appear as a false, short-range target on the screen of the radar indicator.

In general it will not be possible to achieve any substantial reduction in bandwidth by altering any of the parameters of the searching radar system. The pulse width is dictated by the velocity of propagation of electromagnetic energy in space and the range resolution desired. The signal-to-noise ratio of the received echo signals is a function of the total time during which the target is illuminated by the radar system. Therefore it is usually not practical to reduce the pulse repetition frequency of the radar system to a point where the target is illuminated only once per radar scan. For reasons already mentioned, it is impractical to reduce the spacing between successive transmitted pulses. Therefore, a practical system for reducing bandwidth of radar accumulated data must eliminate the redundancy and wasted time present in the accumulated data without altering any of the parameters of the searching radar system and without adversely affecting the signal-to-noise ratio or the resolution in range and azimuth of the radar system.

It has been discovered that if the radar data can be stored in a manner such that continuous access can be had to the data stored in the entire radar presentation or to an entire range sweep, then a reduction in bandwidth can be achieved by reading this data out of storage at a relatively slow rate. However, such a system requires an integrating storage tube, or a long persistence indicator, or some similar storage means, and means for scanning the indicator or the storage tube. Such systems, while operative, are subject to the disadvantages that they require costly and complicated storage and scanning equipment, and that they are not well suited for unattended operation.

Therefore it is an object of the present invention to provide a novel and improved system for compressing the bandwidth of useful information present in recurrent pulse trains.

It is a further object of the invention to provide a system for eliminating the redundancy and wasted time in accumulated radar data without altering the manner in which the radar data is accumulated.

It is a further object of the invention to provide a system for compressing the bandwidth of radar accumulated data which requires no moving parts.

Another object of the invention is to provide a system for compressing the bandwidth of a signal which has an output signal-to-noise ratio far superior to non-integrating systems.

These and other objects of the invention are generally accomplished by applying the received radar data or similar pulse train information to a comb filter—for example a sweep integrator circuit—to remove the redundancy present in the input data, and then electrically scanning only the active time interval of the output of the comb filter at a rate which is slow compared to the repetition period of the input data. Data having substantially the same range and azimuth resolution as that accumulated by the scanning radar system, but at a bandwidth suitable for transmission over ordinary open wire or cable telephone lines, is obtained from the output of the electrical scanning means. It will be noted that the present invention makes use of the heretofore unrecognized fact that continuous access to stored data is not required provided an appropriate system for processing intermittently accessible data is provided. In reading the following description of the invention it should be borne in mind that, while the present invention fills a very definite need in the field of scanning radar systems, it is equally applicable to non-scanning radar systems and to many other systems in similar or even unrelated fields which produce repetitive series of pulse trains in which each pulse train conveys substantially the same intelligence.

For a better understanding of the invention together with other and further objects thereof, reference should now be made to the following detailed description which is to be read in conjunction with the accompanying drawings in which:

Fig. 1 is a block diagram of a radar system incorporating a system for data bandwidth compression;

Fig. 2 is a block diagram showing in greater detail the bandwidth compression system of the embodiment of Fig. 1;

Figure 3:
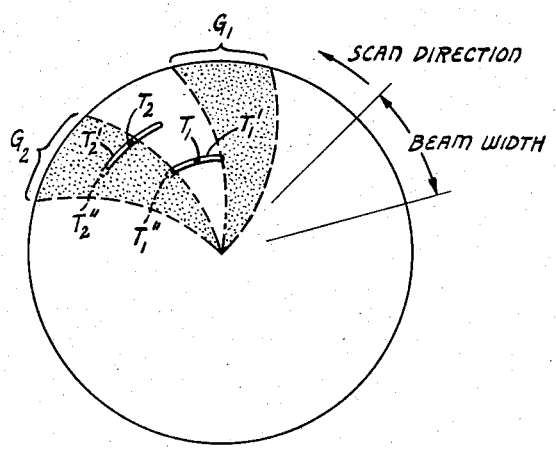
Fig. 3 is a plot illustrating the principle on which the system of Fig. 2 operates.

Proceeding now with a detailed description of the invention, Fig. 1 shows a radar transmitter 10, of a conventional type, which supplies high amplitude, short duration pulses at a microwave frequency to antenna 12. Target reflected echoes of the transmitted pulses are received by antenna 12 and supplied to receiver 16. A duplexer or transmit-receive switch 14 is provided for isolating receiver 16 from transmitter 10. In the embodiment chosen for illustration in Fig. 1 the receiver 16 includes moving target indication unit 18 as part of its output circuit. Unit 18 may contain conventional video delay and subtraction circuits which are in common use in moving target detection systems to eliminate fixed target echoes from the radar presentation. If the radar system is to be employed to detect both fixed and moving targets, unit 18 may be omitted from receiver 16 without altering the operation of the bandwidth compression system. The video signal from unit 18 is supplied to a sweep integrator 20. Sweep integrator 20 may be of the type employing a delay line and a feedback loop connecting the output of the delay line to the input thereof, this feedback loop having a gain slightly less than unity. A sweep integrator operating with amplitude modulated signals is shown in greater detail in Fig. 2. It is also within the scope of the invention to employ a frequency modulated sweep integrator of the type disclosed in my copending application Serial No. 281,414, filed April 9, 1952, now Patent No. 2,841,704, or other sweep integrators providing equivalent storage of the received radar data. A sweep integrator is a particular type of comb filter having many relatively narrow passbands at harmonics of the frequency having a period equal to the delay time of the recirculating loop. It is within the scope of the present invention to employ a comb filter composed of inductors and capacitors arranged to give the necessary multiple passband characteristic. However, such a comb filter is not practical for most purposes since approximately 250 passbands are required covering a frequency range of 20 kilocycles to 300 kilocycles. Recent investigations in the fields of nuclear resonators and proton resonance suggest that other types of comb filters equal to or superior in performance to known types of sweep integrators may be available in the near future. The methods of connecting such comb filters into the system shown in Fig. 1 will be apparent once the nature of the present invention is fully understood.

It is generally necessary that the pulse repetition frequency of the radar transmitter bear some fixed relationship to the constants of the sweep integrator. For this reason, a connection 22 is made from sweep integrator 20 to the radar transmitter 10 over which is supplied a synchronizing signal to control the pulse repetition frequency of transmitter 10. If MTI unit 18 is a video delay and subtraction type circuit it is essential that the delay in this circuit be exactly equal to the delay which controls the pulse repetition frequency of the transmitter 10. This can be accomplished by employing identical delay lines in units 18 and 20 which are located within the same thermal enclosure. Alternatively, the same delay line may be employed for the two units provided separate carrier frequencies or some other suitable signal separation method is employed.

The output of sweep integrator 20 is supplied to a gate circuit 24. Gate circuit 24 may be a vacuum tube amplifier stage which is normally held inoperative by a large negative bias on the screen grid. There are many other types of gate circuits known in the art, but the one mentioned above will serve to illustrate the operation of the invention. Gate circuit 24 is controlled by a narrow gating signal received from variable delay circuit 28. Delay circuit 28 is controlled, in turn, by signals received from sweep integrator 20 over connection 26 and by a second signal received from a scan generator 30. The function of scan generator 30 is to control the phase between the narrow gating signal supplied by circuit 28 and the synchronizing signal supplied to transmitter 10 and circuit 28 over connections 22 and 26. In a typical embodiment of the invention, variable delay circuit 28 may comprise a simple unistable multivibrator which may be switched to a second quasi-stable state by the synchronizing pulses supplied from sweep integrator 20 and which will remain in this quasi-stable state for a time determined by a potential supplied to a control element thereof. In the embodiment shown in Fig. 2, this last-mentioned potential is supplied by scan generator 30. Circuits of this type are commonly referred to as delay multivibrators. The narrow gate signal to be supplied to gate circuit 24 may be generated by any well known means in response to the signal generated by the change from the quasi-stable state to the stable state of the multivibrator circuit. The gate signal must be of short duration compared to the pulse width of the radar system; otherwise degradation in the range resolution will result.

Scan generator 30 may comprise a sawtooth waveform generator operating at a frequency of 20 to 40 cycles per second. Therefore, the gating signals supplied to gate circuit 24 will have a phase with respect to the pulse signals supplied over connection 26 that varies at a 20 to 40 cycle per second rate in accordance with the amplitude of the signal from scan generator 30. These gate signals render gate circuit 24 operative to pass the video signals from sweep integrator 20 to a boxcar circuit 32. Boxcar circuit 32 is a form of pulse stretcher which converts the narrow pulses in the output of gate circuit 24 to pulses which cover the entire interval between successive gating signals.

The output of boxcar circuit 32 is the radar data compressed to a bandwidth of a few thousand cycles. In order that this data may be displayed at a remote location in some useful form, it is generally necessary to combine with this radar data certain synchronizing signals. Therefore, the signal from boxcar circuit 32 is supplied to a signal combiner 34 which receives synchronizing signals from scan generator 30 and from an azimuth reference generator 36. These signals correspond to the sweep and azimuth synchronizing signals of a conventional radar relay system. Azimuth reference generator 36 may be a potentiometer or rotary transformer having the movable element thereof mechanically connected to antenna 12 as indicated by the broken line 38.

The signals from signal combiner 34 may be supplied to a transmission line 40 which need only have a bandwidth of a few thousand cycles. Obviously then, transmission line 40 may be a conventional 2 wire telephone transmission line.

A remote repeater 42 is provided at any convenient location for displaying, in any convenient manner, the data received from transmission line 40. Suitable circuits for providing such a display are well known in the art and form no part of the present invention. As a typical example, the remote repeater 42 may include a plan position indicator having a long persistence screen. The azimuth sweep of this indicator may be made to rotate in synchronism with antenna 12 through the utilization of the synchronizing signal supplied by reference generator 36. The remote indicator would then include a radial or range sweep circuit operating in synchronism with the signal supplied by scanning generator 30. The radar data derived from boxcar circuit 32 may be supplied to the intensity control of the plan position indicator to provide an intensity modulated display.

A detailed description of the operation of the circuit of Fig. 1 will be deferred until after Fig. 2 has been described.

In Fig. 2, the circuit enclosed within broken line 20 corresponds to sweep integrator 20 of Fig. 1. In general, sweep integrator circuit 20 comprises a delay line 50 which has a delay time equal to a multiple or submultiple of the desired interpulse period of the radar transmitter. It will be assumed that delay line 50 is an ultrasonic delay line having a delay time equal to the desired interpulse period and, for purposes of illustration, that this delay time is of the order of 833 microseconds, corresponding to a pulse repetition frequency of 1,200 pulses per second. Video signals from receiver 16 or unit 18 of Fig. 1 are supplied to a signal adder circuit 52, and from there to a modulator circuit 54. Modulator circuit 54 superimposes the video signals from adder 52 on a carrier frequency in order to facilitate the passage of the video signals through the ultrasonic delay line 50. Delayed signals in the output of delay line 50 are passed through an amplifier 66 and a demodulator 56 to remove the carrier frequency signal. The demodulated video signals are then supplied to amplifier 58 which has its output connected to a second input of adder circuit 52. Therefore, signals in the output of delay line 50 are amplified, added to incoming video signals, and then reapplied to the input of the delay line. The gain of the loop including blocks 50, 52, 54, 56 and 58 is made slightly less than unity in order that the sweep integrator 20 may have a finite integration time. In general, it will be desirable to adjust the gain of this circuit so that the integration time is substantially equal to the target illumination time in order that all signals received from a given target will be integrated. However, if the integration time is made too long, a smearing of the signal in azimuth will result with a corresponding decrease in the abimuth resolution. If the integration time is made either too long or too short, the signal-to-noise ratio of the integrated signal will decrease.

Synchronizing signals are derived from sweep integrator 20 in the following manner. A pulse, having an amplitude several times that of any video target echo signal, is supplied to adder circuit 52 by way of connection 60. This high amplitude pulse passes through delay line 50 and amplifier 58. A pick-off circuit 62 is connected to the amplifier 58 for separating the video signals from this high amplitude synchronizing signal. Pick-off circuit 62 may comprise a diode or triode electron tube having a bias greater than the amplitude of the video signals in the output of amplifier 58 but less than the amplitude of the synchronizing pulses. Therefore, only the high amplitude synchronizing pulses pass through pick-off circuit 62 to a pulse shaper circuit 64. The synchronizing signals in the output of pulse shaper 64 are supplied to the transmitter 10 of Fig. 1 and to adder circuit 52 by way of connection 60. Pulse shaper circuit 64 may include an amplifier, a pulse sharpener and a limiter connected in cascade. The pulse sharpener may be a blocking oscillator circuit which has a free-running period somewhat longer than the desired interpulse period. This blocking oscillator circuit will supply the initial pulse in the timing circuit and thereafter it will be controlled by the pulses received from pick-off circuit 62. The amplifier and limiter included in circuit 64 are required in order to maintain the synchronizing pulses at constant amplitude. The pulse sharpening is desirable since it insures precise timing of all components of the system controlled by the synchronizing pulses. Alternatively, frequency separation rather than amplitude separation may be employed to distinguish synchronization signals from target data signals.

Sawtooth generator 68 of Fig. 2 corresponds to scan generator 30 of Fig. 1. Delay multivibrator 70 and pulse generator 72 of Fig. 2 together correspond to the variable delay circuit 28 of Fig. 1. These circuits have been shown separately in Fig. 2 to illustrate in greater detail one preferred form of circuitry. Since the output signal of a delay multivibrator is a relatively broad pulse having a width proportional to the desired time delay, it is unsuitable for controlling gate 24. Therefore a pulse generator 72, which may be a second multivibrator or a blocking oscillator, is provided to generate a narrow gating pulse having the leading edge thereof in coincidence with the trailing edge of the wide pulse generated by multivibrator 70. Boxcar circuit 32 of Fig. 2 again corresponds to the similarly numbered block in Fig. 1.

In the foregoing description certain typical values for the various parameters of the radar system have been cited. These values are tabulated below in order that they may be available for easy reference in connection with the description of the operation of the embodiment of Figs. 1 and 2 which follows the tabulation. It should be remembered that the invention is not limited to these exemplary values:

| | |
|---|---|
| Antenna beam width | 3°. |
| Antenna scanning rate | 10 r.p.m. |
| Maximum range | 30 miles. |
| Range resolution | ½ mile. |
| Pulse width | 3 microseconds. |
| Pulse repetition period | 833 microseconds. |
| Pulse repetition frequency | 1200 pulses per second. |
| Scan generator rate | 20–40 cycles per second. |
| Gate width | Much less than pulse width. |

Turning now to a description of the operation of Figs. 1 and 2, radar transmitter 10 supplies pulses of electromagnetic energy to antenna 12 which radiates these pulses in a directive beam. Target reflected echo signals resulting from reflection of the transmitted energy from objects in space are picked up by antenna 12 and amplified and detected in receiver 16. The action of MTI unit 18 will not be discussed since it is well known and does not affect the bandwidth compression system. A radar system having the parameters tabulated above will illuminate a point target in space for approximately 1/20 of a second, or approximately 60 transmitted pulses. The 60 or more video signals from each target are supplied in succession to sweep integrator circuit 20 which stores these signals in the recirculating loop. The output of sweep integrator 20, corresponding to signals received from one particular target, is proportional to the weighted sum of all the video signals. The weighting factor is determined by the gain of the recirculating loop and the length of time (number of recirculations) that the particular video signal has been stored. As mentioned above, the integration time of the sweep integrator should be equal to or less than the target illumination time in order to eliminate any aperture effect or smearing of the target signal in azimuth. An integration time equal to from 1/2 to 3/4 the target illumination time will give good results in most instances. It will be remembered that signals from objects at different ranges are maintained separate in the sweep integrator so that several signals at different ranges may undergo integration in the sweep integrator at one time. The signal from scanning generator 30 causes the delay time of delay circuit 28 to vary from zero to approximately 325 microseconds, corresponding to a range variation of 0 to 30 miles. This variation takes place at a rate of 20 to 40 cycles per second depending upon the frequency of the sawtooth signal from scan generator 30. The period of the signal from scanning generator 30 preferably should not be greater than the target illumination time; otherwise target signals may appear and then disappear in the output of sweep integrator 20 before being coupled to boxcar circuit 32 through gate circuit 24. However, the scan frequency of scanning generator 30 should be made as low as possible since the bandwidth of the output signal will be directly proportional to the frequency at which this circuit operates. Therefore a period equal to or greater than 1/2 the illumination time for a point target will generally be found to be highly satisfactory. A scanning frequency of 20 cycles per second will be assumed in the illustrative examples which follow. It should be noted that the gate signal scans only the first 325$\mu$-seconds of the interpulse period rather than the entire 833$\mu$-second interpulse period. Therefore the dead time present in the radar accumulated data does not contribute to the bandwidth of the output signal.

The operation of gate circuit 24 is illustrated in Figs. 3 and 4A through 4C. The assumed parameters of the radar system have been changed, for the example chosen for Figs. 3 and 4, in order that the effects under consideration will be visible on a diagram of reasonable size. As shown in Fig. 3, it is assumed that the beamwidth of the antenna is 30° and that the scan period of scan generator 30 is equal to the target illumination time. The further assumption is made that two targets, $T_1$ and $T_2$, at different ranges, are present in the area being scanned. The solid black dots designated as $T_1$ and $T_2$ in Fig. 3 indicate the true position of the targets in space. The open arcuate areas $T_1'$ and $T_2'$ represent the apparent size of the target, the enlargement being due to the finite beamwidth of the radar system. The dotted lines $T_1''$ and $T_2''$ illustrate the further enlargement of the apparent size of the target resulting from the finite memory time in the sweep integrator 20. The shaded spiral path $G_1$ represents the area of the ground scanned by the radar antenna during one scan of the gate signal. The spiral area of $G_2$ represents the area scanned during the next scan of the gate signal. It can be shown that, because of the apparent enlargements of the targets due to the finite beamwidth of the antenna, if the scan period of the gate does not exceed the target illumination time, then no targets would be missed even in a non-storage system. However, only one or two echo signals would be received from certain targets, and a very poor signal-to-noise ratio would result. By incorporating sweep integrator 20 in the bandwidth compression system, the signals received from a target are stored until the scanning gate reaches the proper point in time to permit these signals to pass to boxcar circuit 32. This action greatly improves the signal-to-noise ratio of the output signal and eliminates completely the possibility, which is always present in non-integrating systems, of missing a target under conditions which cause intermittent fading of the returned echo signals.

Figs. 4A through 4C illustrate the action of the gate circuit 24 and boxcar circuit 32 in responding to echoes received from target $T_1$ shown in Fig. 3. Fig. 4A represents the radar video signal at the output of sweep integrator 20. The fact that all of the echo signals are of the same amplitude indicates that the targets have been illuminated for a considerable time—say 15 or more sweeps—and that the output of the sweep integrator has reached an equilibrium condition. It is not necessary that the output of the sweep integrator reach an equilibrium condition before being scanned by the gate, and in fact this condition probably will not exist under some operating conditions. Fig. 4A shows the dead time D and the redundant information designated by the letter R.

Figure 4:
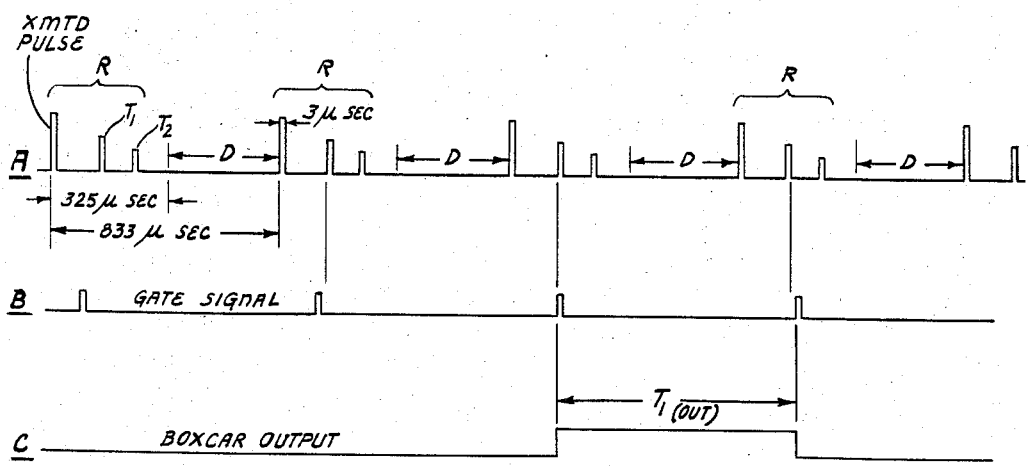
Figs. 4A, 4B and 4C are amplitude versus time plots of representative waveforms in the systems of Figs. 1 and 2.

The gate from variable delay circuit 28 is shown in Fig. 4B. This gate is shown drifting very slowly to the right on each successive pulse repetition period, so that it occurs in time coincidence with the echo signal representing target $T_1$ on the third repetition period shown in Fig. 4. The gate pulse will cover the 833–D$\mu$-seconds in 60 steps corresponding to the 60 resolvable range elements.

The output of boxcar circuit 32 is shown in Fig. 4C. The output rises to the amplitude of the signal $T_1$ in Fig. 4A at the instant that the gate signal of Fig. 4B coincides with the pulse $T_1$ of Fig. 4A and then remains at this amplitude until the following gate pulse. If target $T_1$ is a point target, the following gate signal will not occur in coincidence with pulse $T_1$, and the output of boxcar circuit 32 will return to zero. This condition is illustrated in Fig. 4C where the 3$\mu$-second pulse representing target $T_1$ in Fig. 4A has been converted to an 833$\mu$-second pulse in Fig. 4C. If the target extends for a considerable distance in range—for example 1/2 mile—the target pulse in Fig. 4A will be longer than 3$\mu$-seconds and two successive gate signals will occur in coincidence therewith. This merely doubles the width of the output pulse from boxcar circuit 32. If other forms of pulse stretchers are substituted for boxcar circuit 32, the stretched pulses may have a duration less than 833$\mu$-seconds. This may increase the bandwidth of the compressed signal by a small factor but will not otherwise alter the operation of the embodiment described herein.

A second signal will appear in the output of boxcar circuit 32 at the time the gate pulse moves into time coincidence with target $T_2$. Therefore, the output of boxcar circuit 32 will correspond to one pulse repetition period of Fig. 4A with the dead time eliminated. However, it will require 1/20 of a second for the output of boxcar circuit 32 to complete this waveform as compared to only 833$\mu$-seconds for the radar video signals shown in Fig. 4A. This scanning operation is continued every 1/20 of a second as the antenna rotates in azimuth.

The broad pulses in waveform 4C accurately represent the accumulated radar data but require only a narrow bandwidth for transmission. Therefore the system just described accomplishes the stated object of accurately representing the radar accumulated data by a signal compressed in bandwidth to a point where it can be transmitted over an open wire telephone line or cable, or by any similar means. As explained above, the output of boxcar circuit 32 is combined with the synchronizing signals from azimuth reference generator 36 and scan generator 30 before being sent to the remote repeater 42.

It should be noted that the compressed bandwidth data contains all information except the pulse-to-pulse variation of successive pulses from the same target. In most instances the information to be derived from this variation can be extracted before bandwidth compression, as, for example, in MTI unit 18.

The preferred embodiment of the invention described above employs a gate that scans the output of sweep integrator 20 at a uniform rate. While this is believed to be the simplest and therefore the preferred form of scanning, it should be well understood that the invention is not to be strictly limited thereto. It can be shown that the same compression in bandwidth and the same azimuth and range resolution can be achieved by scanning the resolvable elements in accordance with any preselected program or schedule which causes all elements to be scanned once before any element is scanned for a second time. Programs which scan certain resolvable elements more than once before all elements have been scanned also fall within the scope of the invention but are somewhat less desirable since the bandwith of the output signal is increased without a corresponding increase in transmitted intelligence. The remote indicator 42 should display the received data in accordance with a program or schedule which is indentical to the scanning schedule. The necessary synchronizing signals for accomplishing this result may be obtained from scan generator 30 and azimuth reference generator 36.

The preferred embodiment of the invention shown in Fig. 1 is relatively inexpensive and easy to construct, especially on a mass production basis, and no special circuit components are required. Since no mechanical scanning equipment is required in the bandwidth compression unit, the embodiment shown in Fig. 1 is ideally suited for unattended operation in remote and inaccessible locations.

Various changes and modifications may be made in the embodiment shown without departing from the spirit and scope of the invention. Such changes as increasing or decreasing the pulse repetition frequency or beamwidth of the radar system may affect the choice of other system parameters but will not alter the general mode of operation of the invention. It should be obvious that the invention is applicable to radar systems having stationary antennas or manually or automatically directed antennas. In such applications the scan rate for the gate, and the memory time of the sweep integrator, may be selected without reference to the target illumination time, which is infinite for all practical purposes. Changes may also be made in the circuits for generating the various control signals mentioned throughout the specification, and certain changes may be made in these signals without departing from the invention. Therefore, while there has been described what is at present considered to be a preferred embodiment of the invention, the scope of the invention is pointed out in the hereinafter appended claims.

What is claimed is:

1. A system for generating a signal of relatively narrow bandwith containing the intelligence present in a wide bandwidth signal comprising a repetitive series of trains of pulses of short duration, said system comprising a recirculating signal type sweep integrator having a delay time integrally related to the repetition period of said pulse trains, said sweep integrator including input means for receiving said wide bandwidth signal, a gate circuit connected to the output of said sweep integrator, said gate circuit being normally inoperative to pass signals supplied thereto, means associated with said gate circuit for rendering it periodically operative to pass signals from said sweep integrator, said last mentioned means being arranged to cause the interval between successive operative intervals of said gate circuit and a selected reference time in the next preceding pulse train to vary in steps, said steps being not greater than the duration of said short duration pulses, said operative intervals being short compared to the duration of said short duration pulses, and means connected to the output of said gate circuit for increasing the time duration of signals passed thereby.

2. In combination with a radar system including a transmitter for generating a series of time spaced energy pulses, a receiver for detecting target reflected echo signals, and a utilization means for bandwidth compressed radar data, a system for compressing the bandwidth of radar accumulated data, said bandwidth compression system comprising a recirculating signal type sweep integrator circuit connected to said receiver so as to receive target echo signals therefrom, a gate circuit connecting said sweep integrator circuit to said utilization circuit, said gate circuit being normally inoperative to pass signals, and means associated with said gate circuit for rendering said gate circuit periodically operative to pass signals from said sweep integrator to said utilization circuit, the period between operative intervals of said gate circuit differing from the interpulse period of said radar system by a small fraction of said interpulse period.

3. In combination with a radar system including a transmitter for generating a series of time spaced energy pulses, a scanning antenna associated with said transmitter for radiating said energy pulses and receiving target reflected echoes, a receiver for detecting said target reflected echo pulses, and a utilization means for bandwidth compressed radar accumulated data, a system for compressing the bandwidth of radar accumulated data comprising a recirculating signal type sweep integrator circuit connected to said receiver so as to receive target echo signals therefrom, a gate circuit connecting said sweep integrator to said utilization means, said gate circuit being normally inoperative to pass signals from said sweep integrator to said utiliaztion means, and means associated with said gate circuit for rendering said gate circuit periodically operative to pass signals from said sweep integrator to said utilization means, said last-mentioned means being arranged to cause the time interval between an operative interval of said gate circuit and the next preceding energy pulse radiated by said antenna to vary in uniform steps between preselected limits, the number of said steps being related approximately to the number of energy pulses illuminating a point target in space by a small integer, said last-mentioned means being arranged to cause said variation to repeat itself in a cyclic manner at intervals not greater than the illumination time of a point target in space by said radar system.

4. In combination with a detector system including a transmitter for generating a series of time spaced energy pulses, a scanning radiating means associated with said transmitter for radiating said energy pulses in a directive beam and for receiving target reflected echoes and a receiver for detecting said target reflected echo pulses, a system for compressing the bandwith of accumulated data comprising a recirculating signal type sweep integrator circuit connected to said receiver so as to receive detected target reflected echo signals therefrom, means connecting said sweep integrator to said transmitter so as to control the pulse repetition rate thereof, a gate circuit connected to the output of said sweep integrator, said gate circuit being normally inoperative to pass signals received from said sweep integrator, and means associated with said gate circuit for rendering said gate circuit periodically operative to pass signals from said sweep integrator, the operative intervals of said gate circuit being short relative to the time duration of said radiated energy pulses, said last-mentioned means being arranged to cause the time interval between an operative interval of said gate circuit and the next preceding energy pulse radiated by said radiating means to vary in steps between predetermined limits, said steps being approximately equal in time duration to the radiated pulses, the number of said steps being approximately equal to the number of energy pulses illuminating a point target in space, said last-mentioned means being arranged to cause said variation to repeat itself in a cyclic manner at intervals not greater than the illumination time of a point target in space, and a pulse stretching circuit connected to the output of said gate circuit for increasing the time duration of signals passed thereby.

5. A system for generating a signal of relatively narrow bandwidth containing a substantial amount of the intelligence present in a series of echo signals received by a pulse type radar system, said signal generating system comprising a recirculating signal type sweep integrator system having a delay time which is integrally related to the repetition period of said radar system, a normally inoperative, pulse actuated gate circuit connected to the output of said sweep integrator, means for generating a series of gating pulses comprising a delay multivibrator, means for supplying a synchronizing signal to said delay multivibrator to actuate it at times bearing a fixed relationship to the times of transmission of pulses by said radar system, a sawtooth wave generator connected to said delay multivibrator for controlling the delay produced thereby, and a gate generating circuit connected to the delay multivibrator so as to be controlled in time phase thereby, said gate generating circuit being connected to said gate circuit to control the operation thereof, and means connected to the output of said gate circuit for increasing the time duration of signals passed thereby.

6. In combination with a detector system including a transmitter for generating a series of time-spaced energy pulses, a scanning radiating means associated with said transmitter for radiating said energy pulses in a directive beam and for receiving target reflected echoes and a receiver for detecting said target reflected echo pulses, a system for compressing the bandwidth of accumulated data comprising a sweep integrator circuit connected to said receiver so as to receive detected target reflected echo signals therefrom, said sweep integrator circuit comprising a multi-input adder circuit, one input of said adder circuit being connected to said receiver, a modulator circuit, a delay line, and a demodulator circuit, said adder circuit, said modulator circuit, said delay line and said demodulator circuit being connected in a closed series loop in the order recited, said series loop further including signal amplifier means, a pulse pick-off circuit coupled to said closed series loop at a point immediately preceding said adder circuit, a pulse shaper circuit connected to the output of said pulse pick-off circuit, said pulse shaper circuit providing in response to each pulse supplied by said pulse pick-off circuit a pulse of greater amplitude than the radar video pulses circulating in said closed series loop, means connecting the output of said pulse shaper circuit to one input of said adder circuit, means connecting said pulse shaper circuit to said transmitter so as to control the pulse repetition rate thereof, a gate circuit connected to the output of said sweep integrator, said gate circuit being normally inoperative to pass signals received from said sweep integrator, means associated with said gate circuit for rendering said gate circuit periodically operative to pass signals from said sweep integrator, means connecting said pulse shaper circuit to said means associated with said gate circuit for synchronizing the operation thereof, the operative intervals of said gate circuit being short relative to the time duration of said radiated energy pulses, said means associated with said gate circuit being arranged to cause the time interval between an operative interval of said gate circuit and the next preceding energy pulse radiated by said radiating means to vary in steps between predetermined limits, said steps being approximately equal in time duration to the radiated pulses, the number of said steps being approximately equal to the number of energy pulses illuminating a point target in space, said means associated with said gate circuit being arranged to cause said variation to repeat itself in a cyclic manner at intervals not greater than the illumination time of a point target in space, and a pulse stretching circuit connected to the output of said gate circuit for increasing the time duration of signals passed thereby.

References Cited in the file of this patent

UNITED STATES PATENTS

| 2,412,669 | Bedford | Dec. 17, 1946 |
| 2,487,995 | Tucker | Nov. 15, 1949 |
| 2,492,120 | Smith | Dec. 20, 1949 |
| 2,499,941 | Benfer | Mar. 7, 1950 |
| 2,500,633 | Edwards | Mar. 14, 1950 |
| 2,650,357 | Munster | Aug. 25, 1953 |

OTHER REFERENCES

"Radar Signal Sampler Compresses Bandwidth," by W. Otto, Electronics Magazine, vol. 25, No. 4, April 1952, pp. 132–135.